(12) United States Patent
Braun et al.

(10) Patent No.: US 6,883,644 B1
(45) Date of Patent: Apr. 26, 2005

(54) TREE STAND

(76) Inventors: Clifford Braun, 8462 Section Line Rd., Harbor Beach, MI (US) 48441; Derek Woodke, 8271 Jenks Rd., Harbor Beach, MI (US) 48441

(*) Notice: Subject to any disclaimer, the term of this patent is extended or adjusted under 35 U.S.C. 154(b) by 0 days.

(21) Appl. No.: 09/640,557

(22) Filed: Aug. 18, 2000

(51) Int. Cl.[7] .............................. E04G 3/00; A47B 5/00; A47C 31/00
(52) U.S. Cl. ...................... 182/187; 297/217.7; 108/152
(58) Field of Search .................. 49/142, 366; 160/200; 182/187, 188, 136, 135, 116, 20; 108/152, 162, 166, 59; 297/335, 344.1, 344.21, 217.7, 217.1

(56) References Cited

U.S. PATENT DOCUMENTS

| | | | |
|---|---|---|---|
| 2,043,128 A | 6/1936 | Sutton | 304/13 |
| 4,134,474 A | 1/1979 | Stavenau | 182/187 |
| 4,410,066 A | 10/1983 | Swett | 182/135 |
| 4,603,757 A | 8/1986 | Hollinger | 182/187 |
| 4,699,248 A | * 10/1987 | Roy | 182/116 |
| 4,784,239 A | 11/1988 | Kirkman | 182/187 |
| 4,987,972 A | 1/1991 | Helms | 182/187 |
| 5,105,910 A | 4/1992 | Engstrom | 182/187 |
| 5,363,941 A | 11/1994 | Richard | 182/187 |
| 5,433,291 A | 7/1995 | Shoestock | 182/20 |
| 5,538,101 A | 7/1996 | Kempf | 182/116 |
| 5,564,524 A | 10/1996 | Thaggard | 182/116 |
| 5,927,435 A | * 7/1999 | Benton | 182/116 |

FOREIGN PATENT DOCUMENTS

JP          08218613 A    *  8/1996    ........... E04F/19/08

* cited by examiner

*Primary Examiner*—Hugh B. Thompson, II
(74) *Attorney, Agent, or Firm*—John J. Swartz

(57) ABSTRACT

A tree stand including a horizontal platform and mechanism for detachably coupling the platform to a vertical support, such as a tree. The platform includes a vertical access opening therethrough allowing an individual to gain access to the top side of the platform from the underside thereof via a vertical opening extending through the platform. A pair of closure doors is articulately mounted on the platform for swinging movement between co-planar, closed positions, closing the opening and transverse, open positions. The doors can either be individually swingably mounted at there laterally outer edges to the platform or articulately connected to each other and only one of the doors pivotally coupled to the platform.

27 Claims, 10 Drawing Sheets

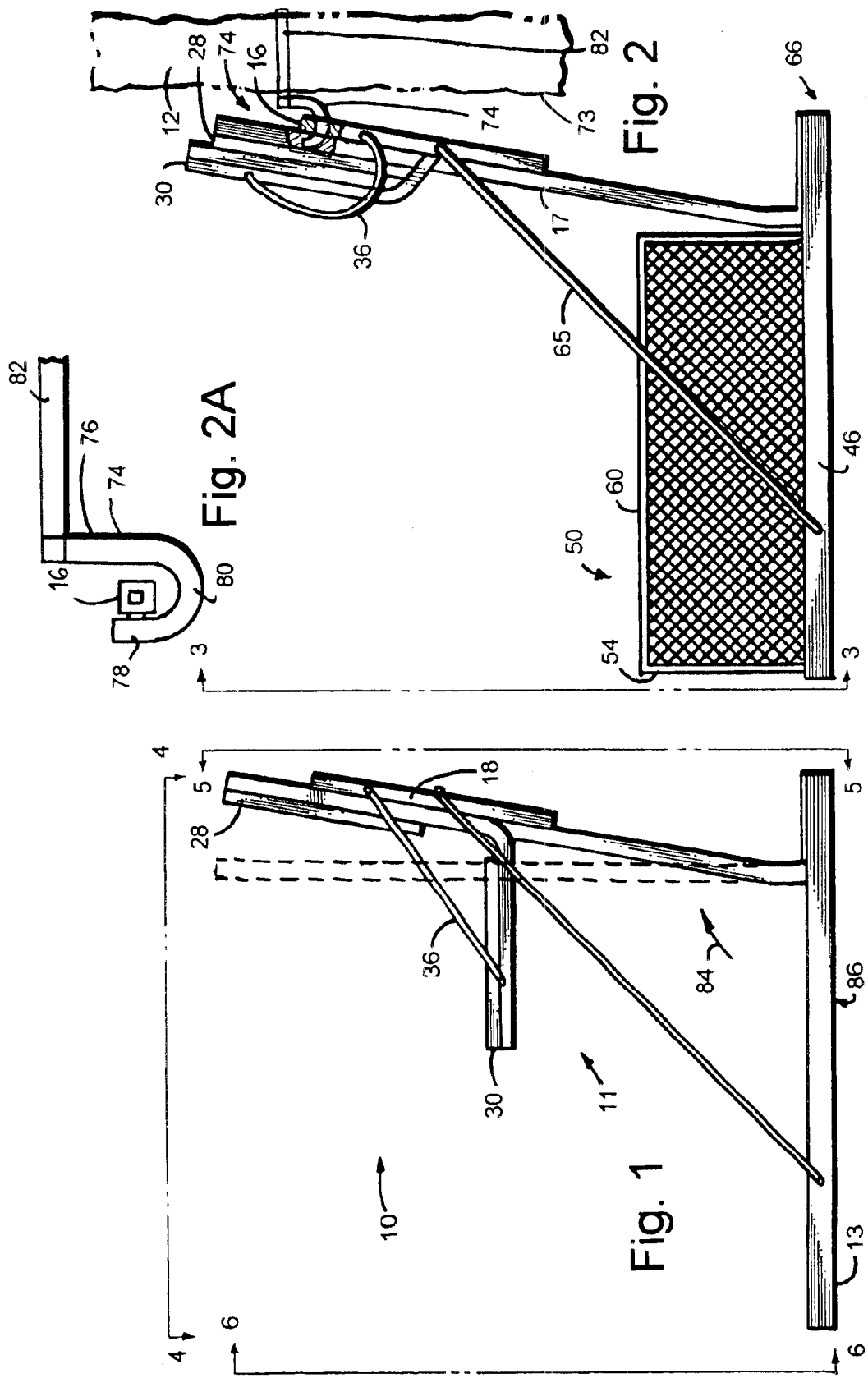

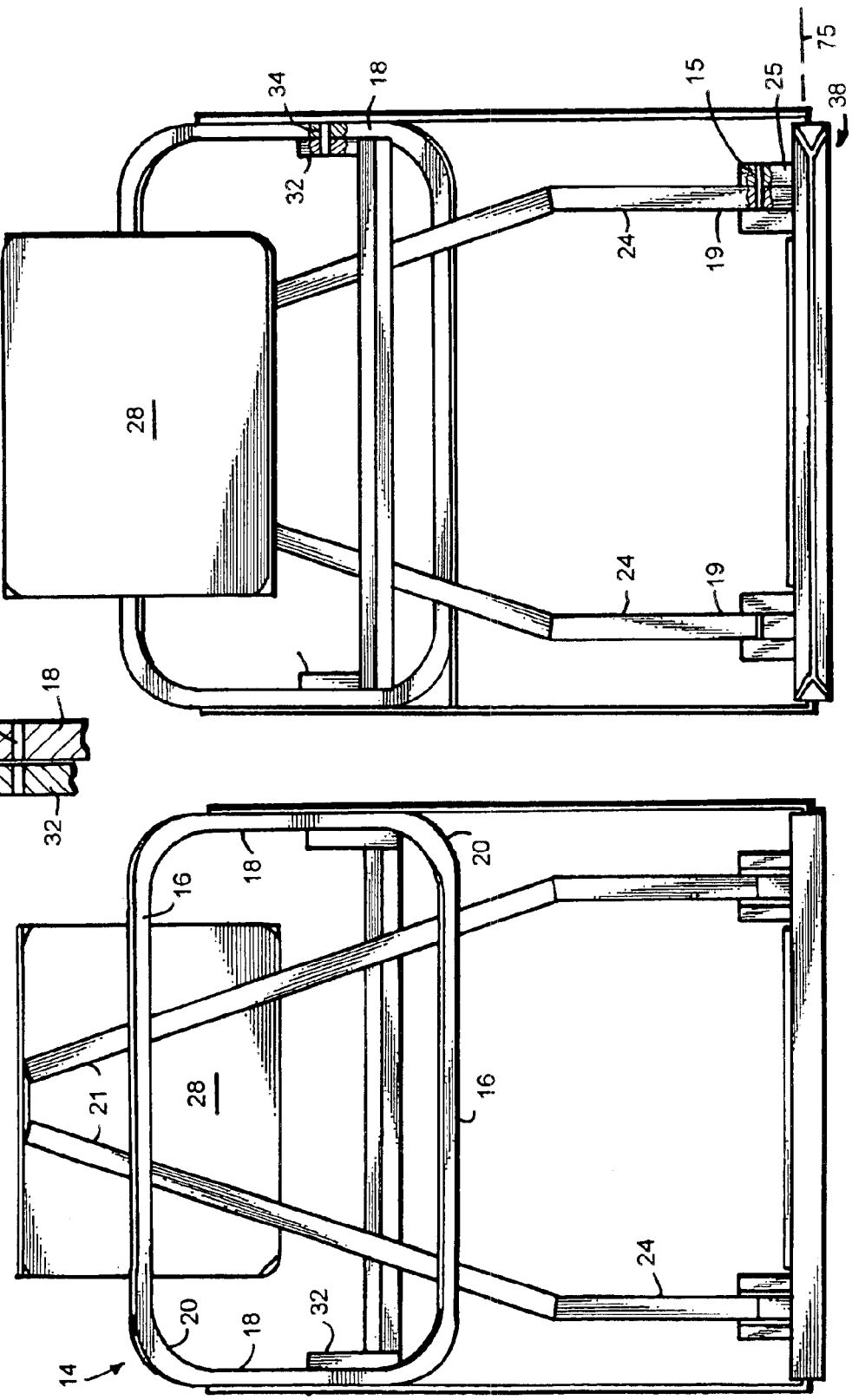

TREE STAND

BACKGROUND OF THE INVENTION

Field of the Invention

This invention relates to a tree stand and more particularly to an elevated platform having a vertical passage therethrough for allowing an individual to pass therethrough between the platform underside and the platform topside and, more particularly, to a new and novel door closure system for opening and closing the passage.

Tree stands are typically mounted on the trunk of a tree a substantial distance above the ground. Heretofore, access to the top side of the tree stand has been gained by way of ladder which leans against the tree and/or by vertically spaced foot pegs which have been detachable threaded into the tree. There is always a danger in laterally transferring oneself from the foot pegs or ladder to the tree stand because the user must laterally transfer himself to the tree stand after reaching the proper height. Such a transfer holds a danger of slipping or falling which is particularly hazardous because the transfer occurs at a substantial distance above the ground. Accordingly, it is an object of the present invention to provide a new and novel tree stand which will minimize the dangers in accessing an elevated platform.

Many tree stands have camouflage side curtains or camouflage material mounted therearound to conceal the hunter from the game which is being hunted. Such camouflaging only exacerbates the problem of laterally accessing the tree stand. It is another object of the present invention to provide a new and novel tree stand having a platform with a vertical opening therethrough for allowing the hunter to vertically pass through an opening in the platform.

It is another object of the present invention to provide a new and novel tree stand of the type described including a vertical opening in the platform and new and novel closure mechanism for closing the vertical opening.

Tree stands have been provided heretofore with openings having a single door thereon which swings upwardly forwardly to allow an individual access therethrough such as that disclosed in U.S. Pat. No. 4,410,066 issued to George W. Swett on Oct. 18, 1983. This stand is likewisely unsafe however, because the user will crawl upwardly and suspend himself above the platform at a height sufficient to allow the door, which was opened to allow access, to swing downwardly to a closed position under the suspended user. That movement requires elevation to a substantial height which is also dangerous. Moreover, the single door is relatively large and relatively difficult to close. Finally, since tree stands are typically utilized by hunters who typically try to minimize noise during set-up. The quiet closure of the large door illustrated in the above referenced U.S. Pat. No. 4,410,066 is relatively difficult to accomplish. Accordingly, its another object of the present invention to provide a new and novel tree stand having a new and novel pivotal closure door system which will provide easier and safer access to the top of an elevated platform.

It is another object of the present invention to provide a tree stand platform which will safely allow a hunter to gain access to the top of the platform from a position below the platform.

It is still another object of the present invention to provide a tree stand of the type described which will allow quieter access thereto.

It is yet another object of the present invention to provide a new and novel tree stand having a pair of closure doors hingedly coupled at their laterally outer edges to the platform.

Still another object of the present invention is to provide a new and novel tree stand of the type described having a pair of doors which are moveable between co-planer positions closing the passage through the tree stand platform and transverse positions opening the passage.

Still yet another object of the present invention is to provide a new and novel tree stand having a vertical access opening therethrough and a pair of closure doors each having a breath not greater than one-half of the breath of the opening.

A further object of the present invention is to provide a new and novel tree stand of the type described having a pair of doors each having a breath substantially equal to one-half the breath of the opening.

A still further object of the present invention is to provide a new and novel tree stand including mechanism articulately coupling a pair of doors to a platform to allow the doors to swing between co-planer positions in the plane of the platform adjacent each other to close a common vertical opening and upstanding positions transverse to the plane.

A further object of the present invention is to provide a tree stand having a vertical opening therethrough and a pair of articulately connected bi-fold doors having one end of one of the doors pivotally coupled to the platform.

Still another object of the present invention is to provide a tree stand of the type described including bi-fold doors having a free end slidably coupled to the platform.

Another object of the present invention is to provide new and novel bi-fold closure doors for a vertical access passage through a platform having one end of one of the closure doors slidably coupled to the platform for linear movement while the opposite end of the one door is swingably coupled to the other door which, in turn, is swingably coupled to the platform for swinging movement between open and closed positions.

These and other objects of the present invention will become more apparent as the description proceeds.

SUMMARY OF THE INVENTION

A tree stand comprising a platform for supporting an individual and including a vertical access passage therethrough for allowing the vertical ascent and descent of an individual therethrough between a position underlying the platform and a position overlying the platform; mechanism for mounting the platform in a generally horizontally disposed position on an upstanding support, such as a tree trunk; a pair of closure doors; and mechanism articulately mounting the closure doors on the platform adjacent to the passage for movement between closure positions adjacent each other and generally lying in the same plane to close the passage and provide a support for an individual overlying the platform and open upstanding positions transverse to the plane alongside said passage to allow an individual to pass through the passage.

BRIEF DESCRIPTION OF THE DRAWING

For a further understanding of the nature and object of the present invention, reference should be had to the following detailed description, taken in conjunction with the accompanying drawings in which:

FIG. 1 is a side elevational view of a tree stand constructed according to the present invention illustrating the position and also in a vertical position the seat in a horizontal position, the platform access doors closed, and the platform in a horizontal position, and also in a raised position in phantom;

FIG. 2 is a similar side elevational view, parts being broken away in section to better illustrate a J-hook for coupling the tree stand to a tree trunk, and illustrating the seat, in a raised, vertical position, one of the platform access doors open, and a tree, in phantom, on which the tree stand is mounted;

FIG. 2A is a greatly enlarged view of the J-hook for coupling the tree stand to a tree trunk;

FIG. 5 is a rear elevational view, taken along the line 5—5 of FIG. 1, wherein the seat is illustrated in the horizontal position and the platform access doors are closed;

FIG. 6 is an opposite front elevational view, taken along the line 6—6 of FIG. 1, illustrating the apparatus constructed according to the present invention with the seat in the horizontal position and the platform access doors closed, parts being broken away to better illustrate the pivot pins for mounting the seat and the platform;

FIG. 6A is a greatly enlarged front sectional view more particularly illustrating one of the seat mounting pivot parts illustrated in FIG. 6;

DESCRIPTION OF THE PREFERRED EMBODIMENT

Figure 4:
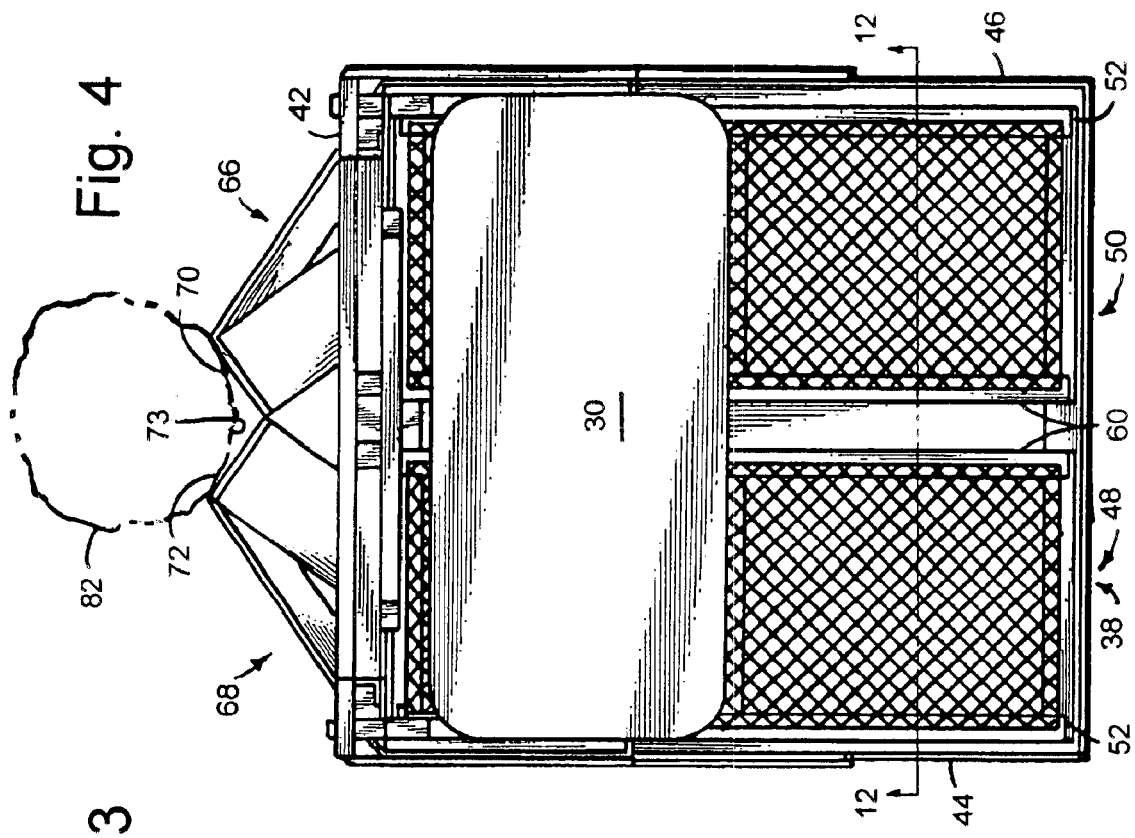
FIG. 4 is a top plan view, taken along the line 44 of FIG. 1, which illustrates the seat in the horizontal position and the platform access doors closed.

A tree stand, generally designated 10, constructed according to the present invention, comprises a foldable chair, generally designated 11, pivotally mounted on a platform, generally designated 13, via pivot pins 15 (FIG. 6). The tree stand 10 is particularly adapted to be mounted in an elevated position on the side of an upstanding support, such as a tree trunk 12. The chair 11 includes a pair of upstanding laterally spaced, rearwardly disposed, rearwardly upwardly inclined frame bars 17 provided with lower vertical ends 19, through which the pivot pins 15 are coupled, and upwardly converging upper ends 21 mounting, a back rest 28. The chair 11 includes a generally rectangular back frame 14 having upper and lower frame bars 16 integrally coupled, at there ends, to a pair of vertical side bars 18 via 90° corner elbows 20. The back frame 14 is welded or otherwise suitably coupled to frame bars 17.

The chair 11 also includes a seat 30 fixed to a pair of L-shaped mounts 32, which are pivotally mounted on the end frame members 18, via pivot pins 34. The seat 30 can swing between the raised vertical or up positions, illustrated in FIG. 2, and the horizontal or down position illustrated in FIG. 1. A pair of flaccid lines or chains, generally designated 36, coupled between the end frame members 18 and the seat 30 prevent downward swinging movement of seat 30 below the horizontal position illustrated in FIG. 1.

The platform 13 includes a platform frame, generally designated 38, having front and rear angle members 40 and 42 respectively spanned by laterally spaced side members 44 and 46. As illustrated in FIGS. 9–12, the platform frame members 40, 42, 44 and 46 are laterally spaced L-shaped or right angle shaped frame bars. The L-shaped platform frame members 40, 42, 44 and 46 including horizontal flanges 41, 43, 45 and 47 (FIGS. 11 and 12), respectively.

The frame members 40, 42, 44 and 46 of platform 13 form an access passage or opening 53 through which an individual can upwardly or downwardly pass to gain access to, or to remove from, the upper side of platform 13.

Hingedly mounted on the front and rear end platform frame angle members 40 and 42, via pivot pins 52, for swinging movement thereon is a pair of platform closure doors, generally designated 48 and 50. The doors 48 and 50 include front and rear inverted L-shaped angle frame members, generally designated 54 and 56, respectively, spanned by laterally outer and inner inverted L-shaped angle frame members 58 and 60. Welded or otherwise or suitably secured to the horizontal flanges 55, 57, 59 and 61 of frame members 54, 56, 58 and 60, respectively, is an expanded metal sheet or screen 62. A central brace 64 spans spaced side frame Members 58 and 60 for supporting the central portion of the expanded metal sheet or screen 62.

Figure 9:
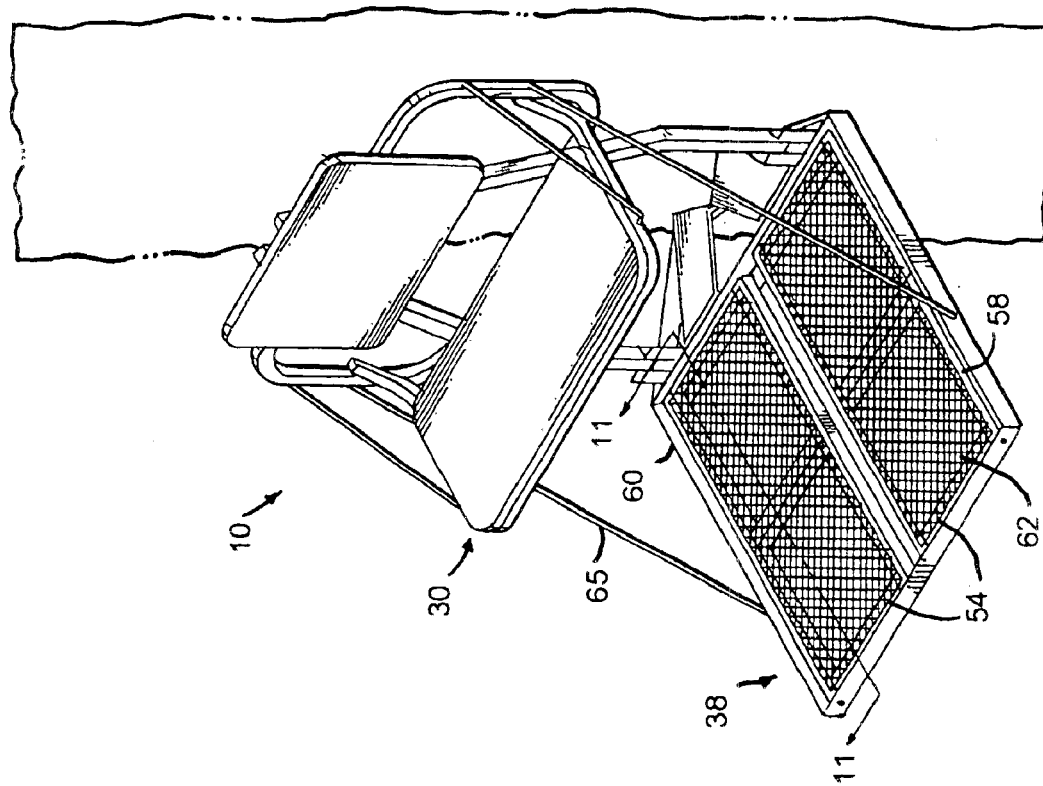
FIG. 9 is a perspective view illustrating the apparatus illustrated in FIGS. 1–8 mounted on an upstanding support, such as a tree trunk, with the seat in a horizontal position and the platform access doors in an open position opening the access passage.
Figure 10:
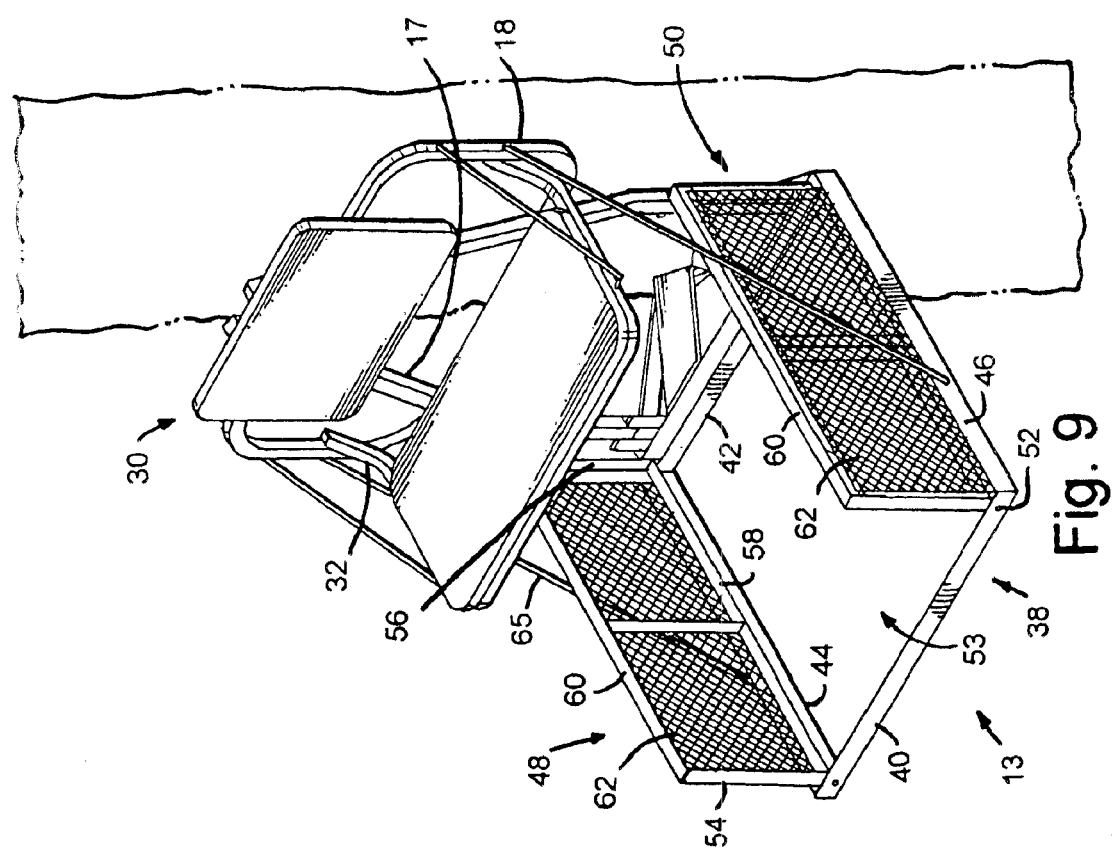
FIG. 10 is a view similar to FIG. 9 but illustrating the seat in a lower horizontal position and the platform access doors in closed positions, closing the access passage.

Flaccid cables 65 are coupled to the back frame members 18 and the laterally outer seat side, frame members 44 and 46 for supporting the platform 13 on the back frame member 14 to preclude its downward swinging movement beyond the horizontal position illustrated in FIGS. 9 and 10.

Welded or otherwise suitably fixed to the back of the rear platform frame bar 42 of the platform frame 38 is a pair of tree receiving brackets, generally designated 66 and 68, (FIG. 4) which form rearwardly diverging surfaces 70 and 72, respectively, for bearing against the front 73 of the tree trunk 12.

The tree stand 10 is detachably mounted on the front 73 of the tree trunk 12 via a J-hook, generally designated 74, having a long rear leg 76 and a short front leg 78 coupled together via a U-shaped curvilinear connector bar 80 which forms a saddle for receiving the upper back frame bar 16. The longer back leg 76 is tightly clamped to the tree trunk 12 via an adjustable length strap 82 which has opposite ends that extend around opposite sides of the tree trunk and are detachably tied together or coupled together with suitable fasteners (not shown).

It should be noted that the back frame bars 17 and back frame 14 are rearwardly upwardly inclined so that the upper frame bar 16 (FIG. 2) is immediately adjacent the front 73 of the tree trunk 12 and the platform 38 is spaced forwardly of the tree trunk 12, as illustrated. The rearwardly diverging tree receiving bracket 70 and 72 project rearwardly relative to the frame 38 so to generally underlie the frame bar 16 and receive a lower portion of the tree trunk 12.

Figure 11:
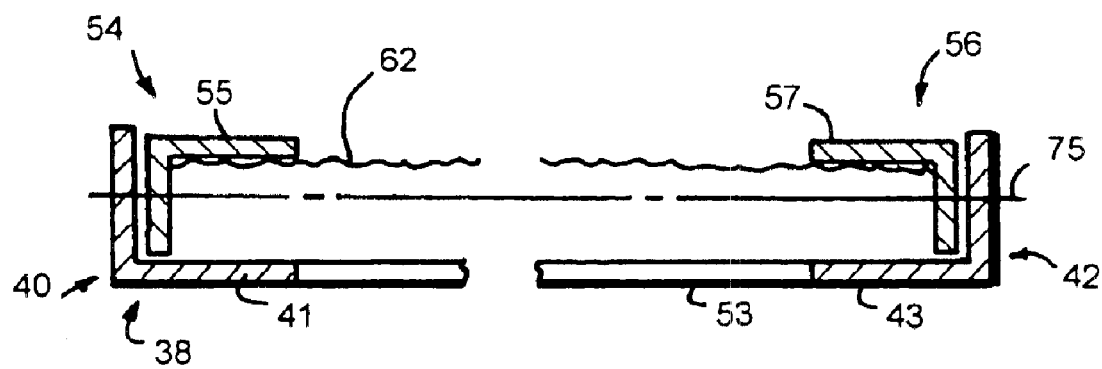
FIG. 11 is a greatly enlarged, partially broken away, sectional side view, taken along the section line 11—11 of FIG. 10.
Figure 12:
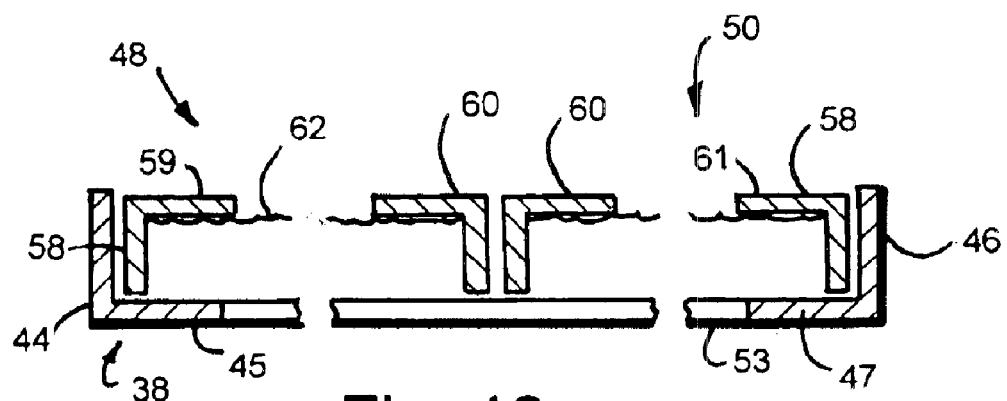
FIG. 12 is a greatly enlarged front sectional view taken along the section line 1212 of FIG. 4.
Figure 13:
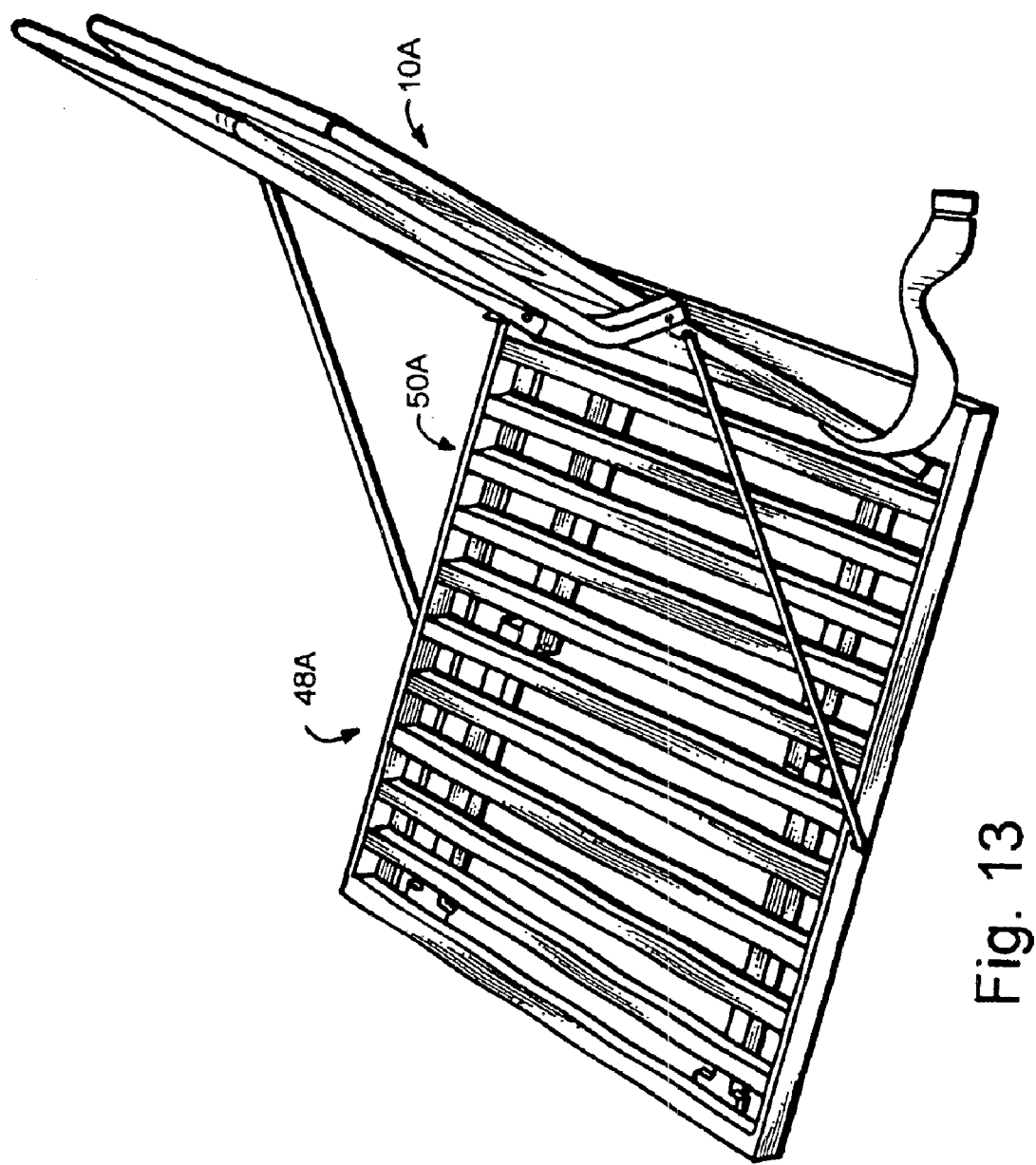
FIG. 13 is a side perspective view of a slightly modified tree stand illustrating the platform and the modified access doors in co-planar horizontal positions and the tree seat in a vertical position.
Figure 17:
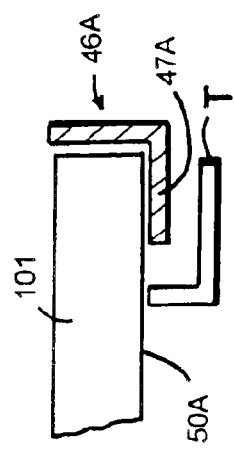
FIG. 17 is a greatly enlarged, sectional view, taken along the line 17A—17A of FIG. 14.
Figure 14:
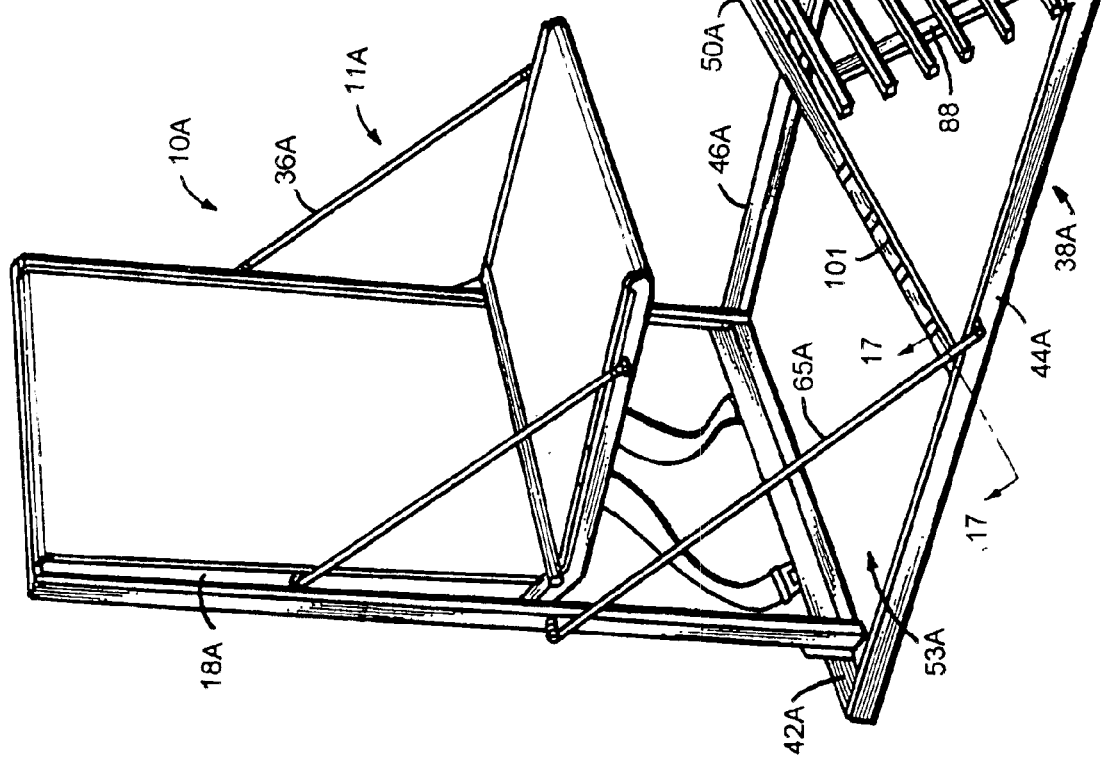
FIG. 14 is an opposite side perspective view of the tree stand illustrated in FIG. 13 illustrating the platform and seat in horizontal positions and the access doors in partially open positions.

As illustrated in FIGS. 10 and 11 the doors 48 and 50 are, when closed, basically co-planar, in the plane 75 of the platform 38 (FIG. 6) and are supported by platform flanges 41, 43, 45 and 47 to provide a strong, lightweight floor which will support a hunter thereon.

The Operation

Figure 3:
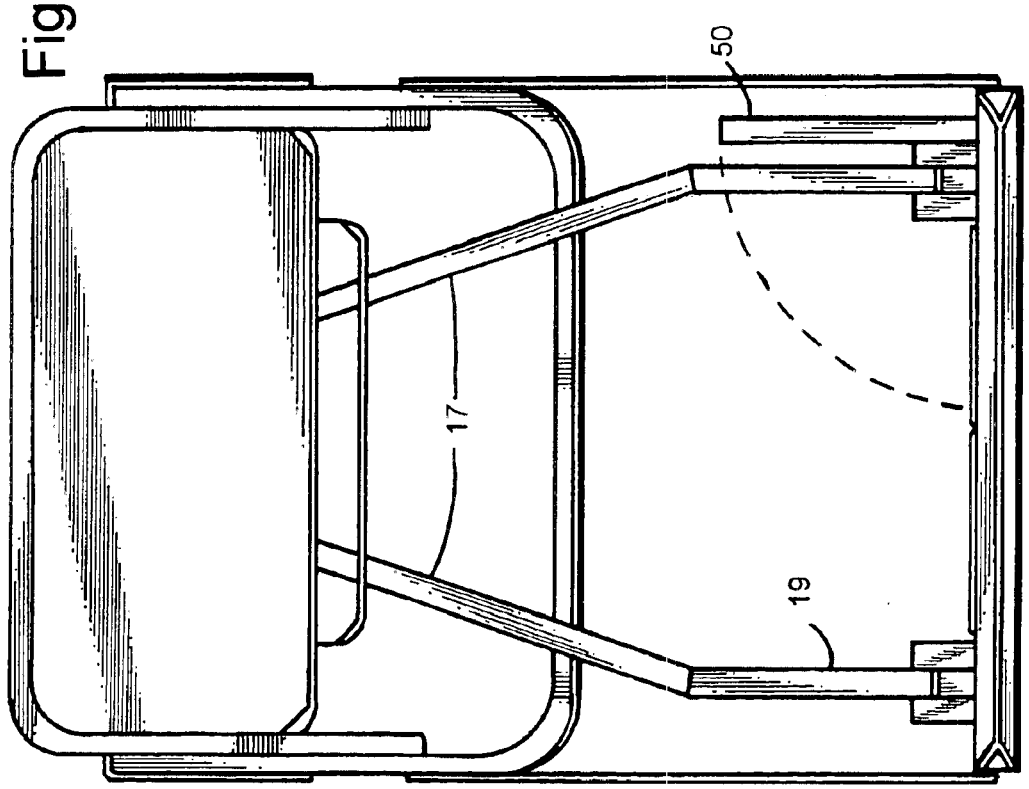
FIG. 3 is a front elevational view thereof, taken along the line 3—3 of FIG. 2, with the seat up and one of the platform access doors open.

The tree stand 10 can be folded for transport to the field with the seat 30 in the raised or vertical position illustrated in FIGS. 3 and 9, and the platform 13 swung upwardly, in the direction of the arrow 84, to the position illustrated in chain lines in FIG. 1, facilitating easy transport of the tree stand 20 to the field. In the field, the user will use a ladder or install vertically spaced foot pegs (not shown) in the tree trunk 12 to climb the tree trunk 12 and carry the folded tree stand 10 up to the desired elevation thereon.

The J-hook 74 is coupled to the tree trunk 12 via the strap 82 passing around the rear J-hook leg 78 and the tree trunk 12. The upper frame bar member 16 is then deposited into the saddle 80 of J-hook 74 (FIG. 2A) with the rearwardly converging frame bars 68, 66 bearing against the front surface 73 of tree trunk 12 as illustrated in FIG. 4. When so positioned, the platform 13 can be lowered from the raised vertical position, illustrated in chain lines FIG. 1, to the lower horizontal position, illustrated in the solid lines in FIG. 1, supported on the back frame member 14 by the side cables 65. The seat 30 will initially remain in the raised vertical position illustrated in solid lines in FIG. 2.

Figure 8:
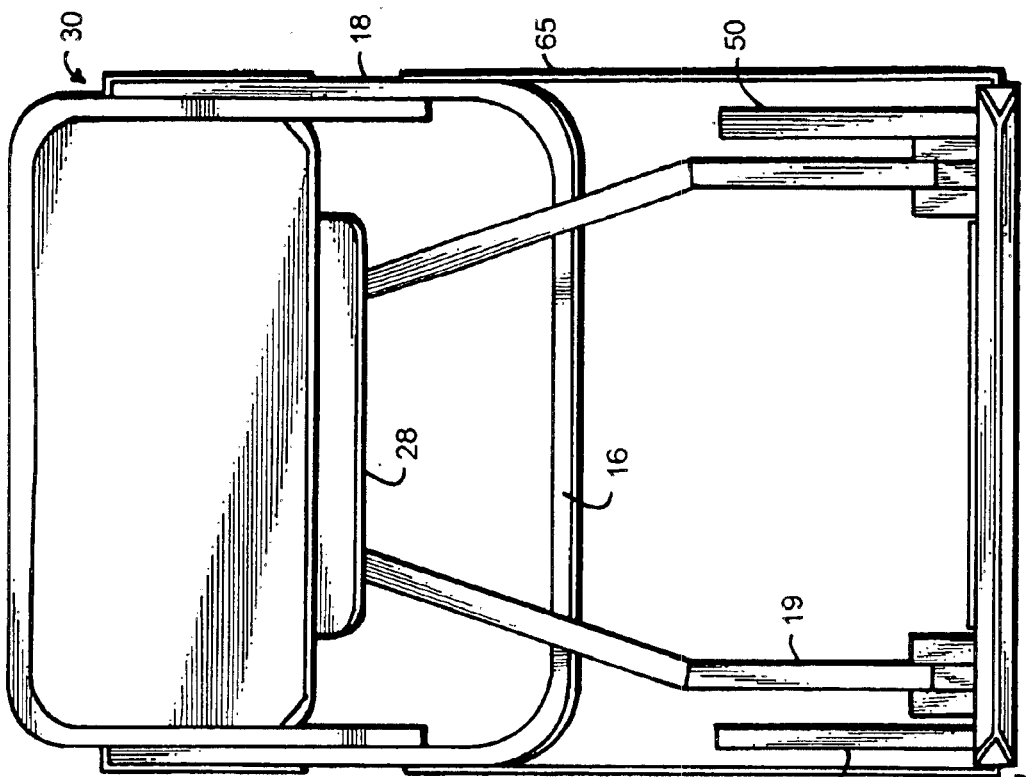
FIG. 8 is a front elevational view of the tree stand illustrated in FIG. 9 with the seat up and the platform access doors open.
Figure 7:
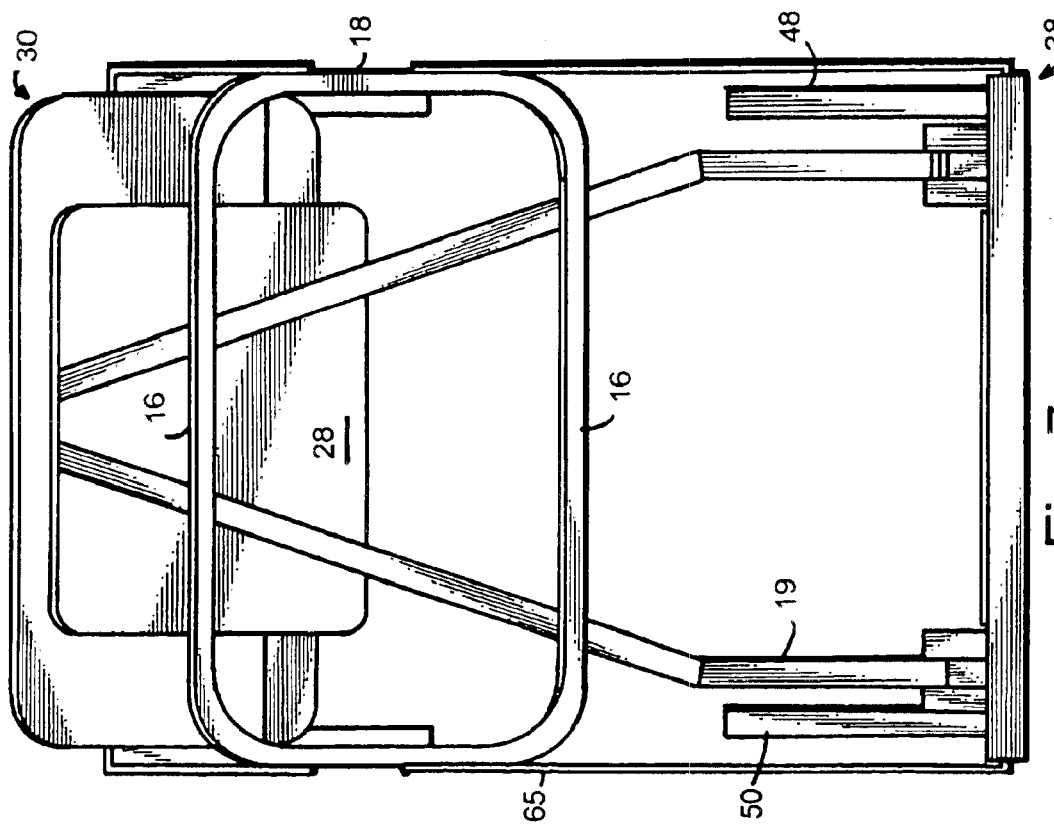
FIG. 7 is a rear elevational view of the tree stand illustrated in FIG. 9 with the seat up and both platform access doors open.

The tree stand can remain so positioned for periodic use by a hunter. When the user desires to gain access to the platform 13, the user, need only, via a ladder or foot pegs, (not shown), approach the underside 86 of the platform 13, and push the laterally adjacent, inner door frame members 60 upwardly to swing the doors 48 and 50 about the pivot pins 52 to the raised, open positions illustrated in FIG. 9. In the transverse positions of the doors 48 & 50, illustrated in FIGS. 7–9, the user can easily move upwardly through the access opening 53 between the open doors 48 and 50 and stand on a portion of the rear brace 42, and/or braces 66 & 68, with one foot and pull one of the doors 50, for example, closed with the other foot and then step on the closed door 50 with the other foot and use the one foot to close the opposite door 48. In the lowered, closed positions of the doors 48 and 50 illustrated in FIG. 10, the doors 48 and 50 close the opening 53 and provide a strong a durable platform to support the user.

When the hunter desires to remove himself from the platform 13, he need only open the doors 48 and 50 to the transverse position illustrated in FIG. 9, and lower himself through the opening 43 onto the pegs or underlying ladder.

Alternate Embodiment

Referring now more particularly to FIGS. 13–16, a slightly modified tree stand, generally designated 10A, is illustrated and generally similar parts will be identified by generally similar reference characters followed by the letter A subscript. The tree stand 10A primarily differs from the tree stand 10 in that the laterally adjacent doors 48 and 50 are replaced by front and rear doors 48A and 50A, respectively. The front door 48A includes a pair of laterally spaced apart tubular bars 88 having front ends 90 pivotally coupled to brackets 92 on the front frame bar 40A via pivot pins 94.

Figure 15:
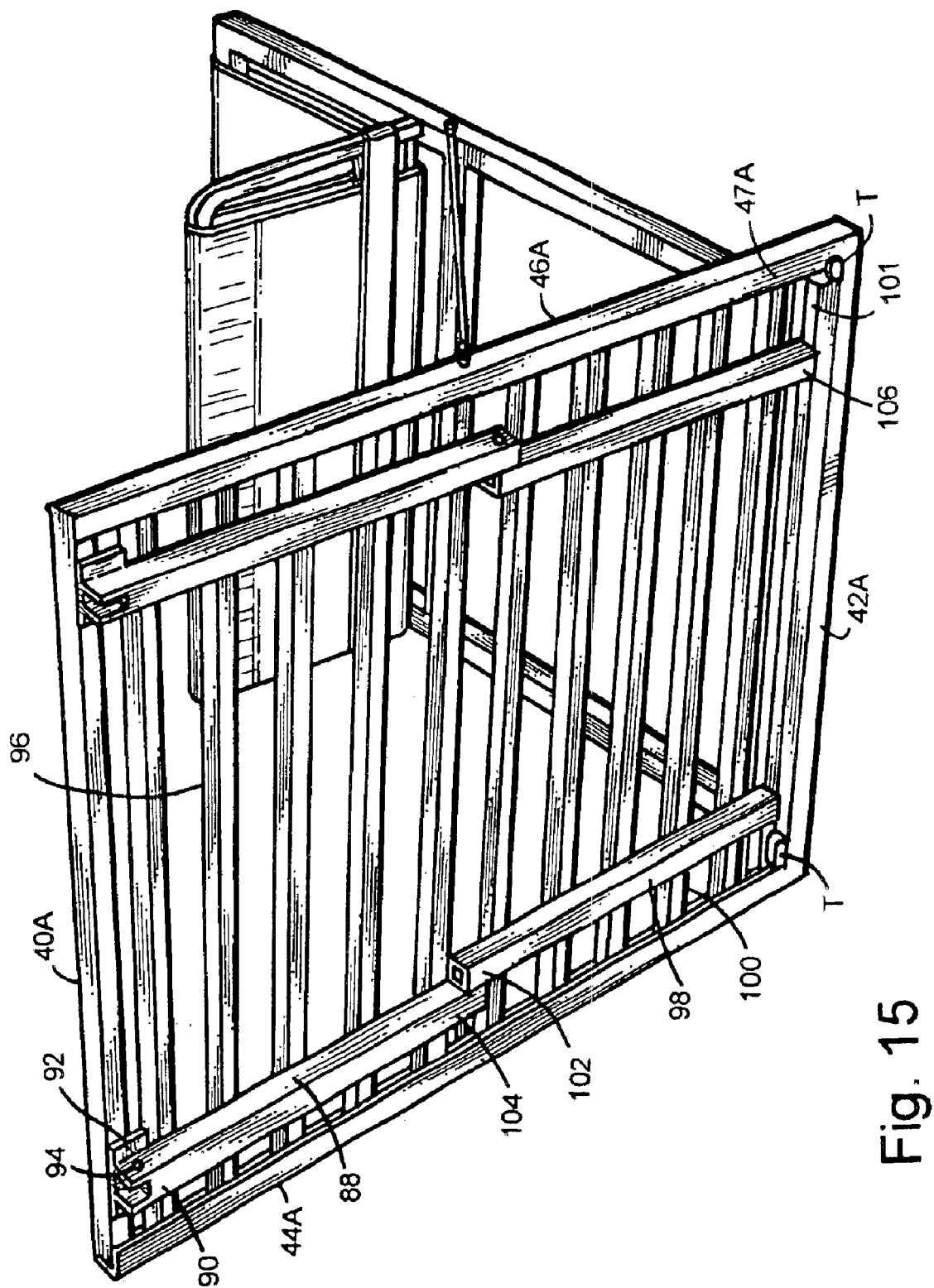
FIG. 15 is a bottom perspective view of the tree stand illustrated in FIG. 13 but illustrating the seat in a horizontal position.

Mounted on the laterally spaced bars tubular bars 88 is a plurality of spaced apart laterally extending tubular frame bars 96 which are welded or otherwise suitably secured to the top sides of the spaced apart tubular bars 88 for supporting, in the lowered position illustrated in FIG. 15, a person thereon.

Figure 16:
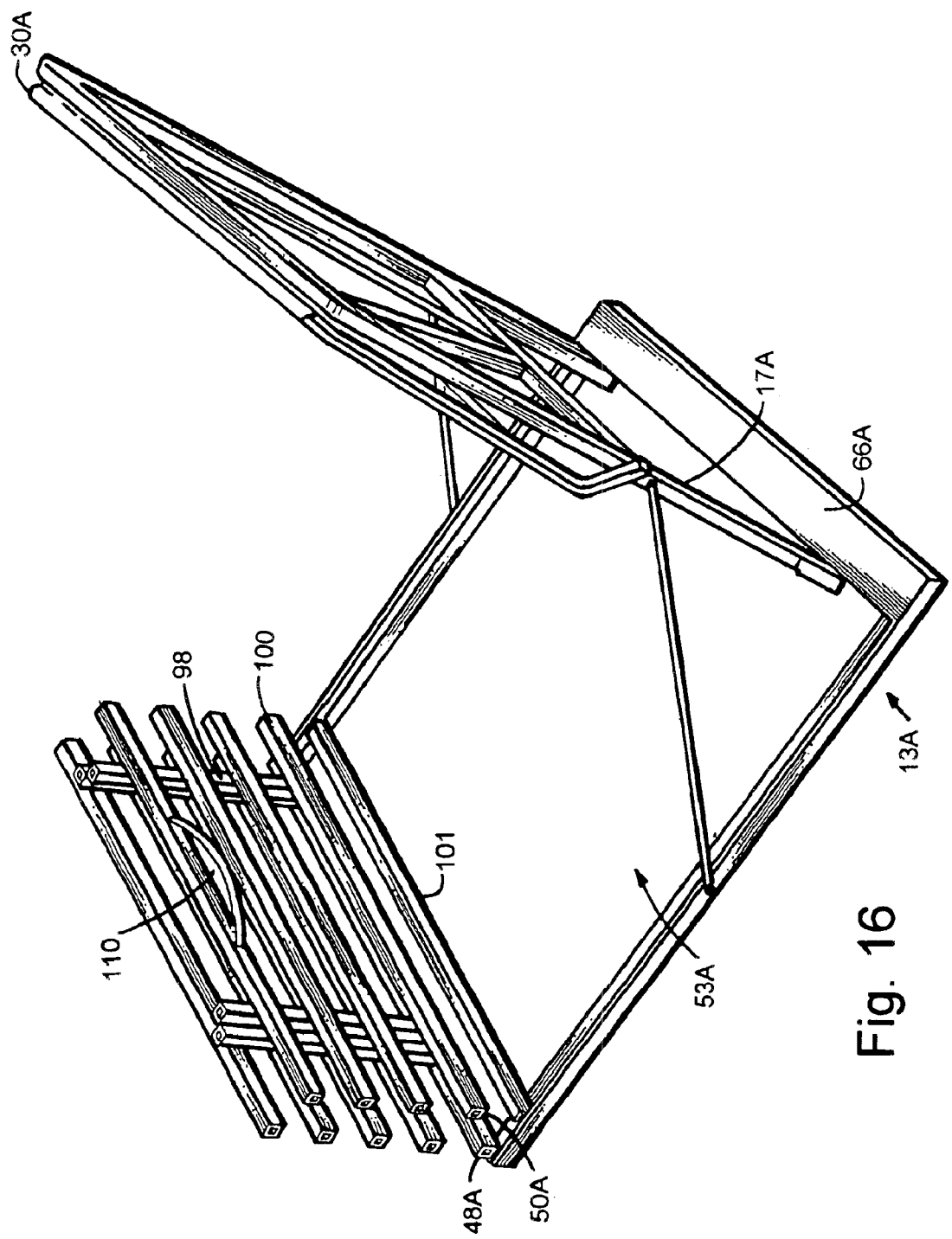
FIG. 16 is a side perspective view, similar to FIG. 13, but illustrating the access doors in open transverse positions.

The rearward door 50A includes a pair of laterally spaced apart tubular bars 98 supporting a plurality of longitudinally cross bars 100 for supporting a user thereon. The cross bars 100 are welded or otherwise suitably affixed to the tubular bars 98. The front ends 102 of the bars 98 are pivotally coupled to the rear ends 104 of the front tubular bars 88. The rearward end 106 of one of the side rails 98 is slidably received on the horizontal leg 47A of the platform side rail 46A via a pair of U-shaped clips, T, welded to opposite ends of the rearward most crossbar 101 coupled to the bars 98, which receives the lower frame leg 47A. The guides 108 force the rear ends 106 of the rear bars 98 to move in a linear path as the doors 48A and 58A are being swung between the co-planar positions, illustrated in FIG. 13, to the upstanding, folded, co-extensive positions alongside each other (FIG. 16). A handle 11( ) is coupled to one of the cross bars 100 to assist this movement.

The rear brace 66A may be constructed identically to the tree braces 66 & 68 but is schematically illustrated as an elongate bar.

In the position of the doors 48A & 50A illustrated in FIG. 16, the opening 53A provides an easy access opening for users to gain access to the topside of the platform 13A. By merely pulling on the handle 110 on the open rear door 50A, both doors 48A and 50A will rearwardly unfold to reassume the co-planar positions as illustrated in FIG. 15 in which the doors 48A and 50A are co-planar. And close the opening 53A.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A tree stand comprising:
   a platform for supporting an individual including
      a perimetrically extending platform frame defining a horizontally outermost platform perimeter and a vertical access opening therethrough for allowing the vertical passage of an individual therethrough between a position underlying the platform frame and a position overlying the platform frame;
   a pair of closure doors for selectively closing said access opening; and
   means articulately mounting said closure doors on said perimetrically extending platform frame adjacent said opening for movement between
      closure positions of the doors adjacent each other, generally lying in the same plane, and completely spanning said frame to close said opening and provide a support for an individual overlying said platform frame, and open upstanding positions transverse to said plane alongside said opening to allow an individual to pass through said opening; and means for mounting said platform in a generally horizontally disposed position on an upstanding support;

a chair including a seat on which an individual positioned on said platform may sit;

and means for mounting said seat in vertically spaced relation with said platform.

2. The tree stand set forth in claim 1 wherein said platform frame lies in said plane of said doors in said closure positions said pair of closure doors comprises latticework having a plurality of crossed strips forming a pattern of open spaces.

3. The tree stand set forth in claim 2 wherein said chair includes a generally upstanding back frame; means articulately coupling said platform on said back frame between a support position transverse to said back frame and a stowed upstanding position extending alongside said back frame.

4. The tree stand set forth in claim 3 including means articulately coupling said seat on said back frame for swinging movement between a generally horizontal support position and a generally vertical position alongside said back frame.

5. The tree stand set forth in claim 4 including first flaccid means spanning a front portion of said platform frame and a portion of said back frame for precluding downward swinging movement of said platform frame beyond a predetermined position relative to said back frame; and second flaccid means spanning a front portion of said seat and an upper portion of said back frame to limit the downward swinging movement of said seat relative to said back frame.

6. The tree stand set forth in claim 1 wherein each of said closure doors includes a laterally inner edge portion and a laterally outer edge portion; said laterally inner edge portions being disposed adjacent each other and in the same plane when said closure doors are in said closure positions and disposed out of said plane when said doors are in said open positions.

7. The tree stand set forth in claim 6 wherein said means articulately mounting said closure doors on said platform frame includes means for swingably coupling at least one of said laterally outer edge portions to a portion of said platform frame adjacent said vertical access opening.

8. The tree stand set forth in claim 6 wherein said doors in said closure positions each close substantially one-half of said opening.

9. The tree stand set forth in claim 6 wherein said means articulately mounting said closure doors on said platform frame includes first and second laterally outer hinge means swingably coupled to said laterally outer portions of said pair of doors to allow said doors to concurrently swing in opposite directions as said doors move between said closure positions and said open positions.

10. The tree stand set forth in claim 9 wherein said means articulately mounting said closure doors in said platform frame includes hinge means swingably coupling said laterally inner edge portions together to fold said doors relative to each other to generally coextensive side-by-side positions in said open positions.

11. The tree stand set forth in claim 10 including guide means coupled to said laterally outer edge portion of the other of said doors to guide the laterally outer edge in a generally linear path between a position adjacent one lateral side of said opening and a position adjacent an opposite lateral side of said opening.

12. The tree stand set forth in claim 6 wherein said perimetrically extending platform frame comprises a pair of longitudinally spaced apart end legs spanned by a pair of laterally spaced apart side legs; each of said side leas including a horizontally disposed flange underlying one of said laterally outer edge portions.

13. The tree stand set forth in claim 1 wherein each of said closure doors comprises an elongate panel having a forward end portion, a rearward end portion and laterally inner and outer edge portions spanning said forward and rearward end portions; said laterally inner edge portions lying in the same plane when said doors are in said closure positions; said means articulately mounting said closure doors including means pivotally coupling at least one of said closure doors for lateral swinging movement on said platform between said closed position and an upstanding position transverse to said plane.

14. The tree stand set forth in claim 13 wherein said means articulately mounting said closure doors includes hinge means swingably coupling said laterally outer portions of said closure doors to said platform frame for movement in opposite swinging directions between said closed positions in which said closure doors are coplanar and said open positions.

15. The tree stand set forth in claim 1 wherein said perimetrically extending platform frame comprises an angle bracket having a vertical leg and a laterally inwardly extending horizontally disposed flange on which said doors, in said closure positions, rest.

16. The tree stand set forth in claim 15 wherein said closure doors in said closure positions include an upper platform surface disposed substantially flush with the upper end of said vertical leg.

17. The tree stand set forth in claim 1 wherein said platform frame comprises forward and rearward parallel end portions and laterally outer edge portions spanning said forward and rearward edge portions;

said means for mounting said platform on an upstanding support comprises a rearwardly extending flange mounted on, and extending rearwardly of, said rearward end portion of sufficient size and strength to support a person standing thereon.

18. The tree stand set forth in claim 1 wherein said platform comprises an L-shaped bracket having a vertical flange and a horizontally inwardly extending horizontal flange mounted on said vertical flange: said doors in said closure positions being supported by said horizontal flange.

19. A tree stand comprising;

a horizontal endless platform frame including a vertical opening therethrough of predetermined breadth of such size for allowing the passage of a person therethrough;

a chair including a seat on which an individual positioned on said platform frame may sit; and means for mounting said seat in vertically spaced relation with said platform frame;

means for detachably coupling said endless platform frame to a vertical support first and second oppositely swingable latticework closure means for selectively completely spanning said frame closing said opening to provide a floor on which a person passing through the opening can stand and swingably movable on said platform frame to an open position allowing a person to vertically pass therethrough;

means articulately mounting said first and second closure means to said platform frame for swinging movement between open and closed positions;

each of said latticework closure means having a plurality of crossed strips forming a pattern of open spaces;

said first and second closure means each having a breadth substantially equal to one-half of said predetermined breadth.

20. In combination with a generally horizontal endless platform frame having an underside and a topside and a vertical access opening therethrough between said underside and topside of sufficient size to permit an individual to pass therethrough between said underside and topside of said platform frame; and means for mounting said platform frame on an upstanding support; the improvement comprising;

a chair including a seat on which an individual positioned on said platform may sit; and means for mounting said seat in vertically spaced relation with said platform frame;

a pair of elongate latticework doors having opposite end portions spanned by laterally inner and outer edge portions; means articulately mounting said doors to said platform frame for swinging movement between closed positions spanning said frame, lying in the same plane and completely closing said opening and open positions transverse to said plane including means pivotally mounting said laterally outer edge portions of said pair of elongate doors to said platform frame for concurrent swinging movement in opposite directions between said closed and open positions.

21. In combination with an elevated platform for supporting an individual and means for supporting said platform on a vertical support, said platform having a platform frame including a front end rail, a rear end rail, and laterally opposite sides rails spanning said front and rear end rails; said front and rear end rails and said laterally opposite side rails defining a vertical access opening therethrough of such size as to allow an individual to vertically pass therethrough; first and second elongate closure doors each having a front end portion, a rear end portion and lateral edge portions panning said front and rear end portions;

a chair including a seat on which an individual positioned on said platform may sit; and means for mounting said seat in vertically spaced relation with said platform;

means articulately coupling said closure doors to said platform frame for swinging movement in opposite directions between coplanar closed positions closing said vertical access opening and transversely disposed open positions including pivot means articulately coupling said doors to said platform frame.

22. The combination set forth in claim 21 wherein said pivot means couples at least said lateral outer edge portions of said doors to said front and rear end rails for swinging movement thereon in opposite directions between said coplanar closed positions and said transversely disposed open positions on laterally outer sides of said opening.

23. The combination set forth in claim 22 wherein said front and rear end rails each comprises an L-shaped frame bars having an upstanding leg and a horizontal leg integral with a lower end of said upstanding leg for supporting one of said doors.

24. The tree stand set forth in claim 21 wherein each of said closure doors includes an endless door frame and latticework, including a plurality of crossed strips forming a pattern said endless door frame.

25. In combination with a platform for supporting an individual and means for supporting said platform on a vertical support, such as an upstanding tree trunk; a chair including a seat on which an individual positioned on said platform may sit; means for mounting said seat in vertically spaced relation with said platform;

said platform having a front end portion, rear end portion, laterally opposite side portions, and a vertical access opening therethrough of sufficient size to allow an individual to pass therethrough, the improvement comprising:

a front closure door having
a front end pivotally coupled to said front end portion of said platform, and
a rear end;

a rear closure door having a front end pivotally coupled to said rear end of said front closure door; said closure doors being movable between coplanar closed positions closing said opening and transversely disposed, open folded positions in which said closure doors are disposed in confronting relation with each other.

26. The combination set forth in claim 31 including means slidably coupling said rear end of said rear door to said platform for sliding movement in a linear path while said front end of said rear closure door swings between said open and closed positions.

27. The combination set forth in claim 23 wherein said platform comprises a door frame having front and rear end frame members spanned by a pair of laterally spaced side frame members; said pivot means comprising:

first pivot members pivotally coupling said front end portion of one of said doors to said front end frame member;

second pivot members pivotally coupling said rear end portion of said one door to said front end portion of the other of said doors for relative opposite swinging movement thereon; and guide means for guiding said rear end of said other door on said frame for linear movement thereon as doors move between said open and closed positions.

* * * * *